US010713335B2

(12) United States Patent
Yost (10) Patent No.: US 10,713,335 B2
(45) Date of Patent: Jul. 14, 2020

(54) SYSTEM, METHOD, AND APPARATUS FOR DETECTING UNLICENSED PERFORMANCES OF COPYRIGHTED CREATIVE WORKS

(71) Applicant: Visa International Service Association, San Francisco, CA (US)

(72) Inventor: Robert M. Yost, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 369 days.

(21) Appl. No.: 15/687,635

(22) Filed: Aug. 28, 2017

(65) Prior Publication Data

US 2019/0065700 A1 Feb. 28, 2019

(51) Int. Cl.
| | |
|---|---|
| *G06F 21/10* | (2013.01) |
| *H04W 4/02* | (2018.01) |
| *G06F 16/40* | (2019.01) |
| *G06F 16/60* | (2019.01) |
| *G06Q 10/10* | (2012.01) |

(Continued)

(52) U.S. Cl.
CPC .............. *G06F 21/10* (2013.01); *G06F 16/40* (2019.01); *G06F 16/60* (2019.01); *G06Q 10/10* (2013.01); *G06Q 30/018* (2013.01); *G06Q 30/0281* (2013.01); *G06Q 30/0283* (2013.01); *G06Q 30/0609* (2013.01); *G06Q 30/0623* (2013.01); *G06Q 50/184* (2013.01); *H04W 4/025* (2013.01); *G06Q 2220/18* (2013.01)

(58) Field of Classification Search
CPC ....... G06F 21/10; G06Q 50/184; G06Q 30/02
See application file for complete search history.

(56) References Cited

U.S. PATENT DOCUMENTS

| | | | | |
|---|---|---|---|---|
| 6,430,301 | B1 * | 8/2002 | Petrovic .................. | G06F 21/10 375/E7.018 |
| 6,826,546 | B1 * | 11/2004 | Shuster .................. | G06Q 30/06 705/52 |

(Continued)

OTHER PUBLICATIONS

A. Baratè, G. Haus, L. A. Ludovico and P. Perlasca, "Managing Intellectual Property in a Music Fruition Environment," in IEEE MultiMedia, vol. 23, No. 2, pp. 84-94, Apr.-Jun. 2016. (Year: 2016).*

(Continued)

*Primary Examiner* — Jacob C. Coppola
(74) *Attorney, Agent, or Firm* — The Webb Law Firm (57) ABSTRACT

Described herein are systems, methods, and apparatuses for providing the detection of displays or performances of copyrighted creative works, determining whether a license exists for those performances, and taking further action depending upon the results of that determination. The systems, methods, and apparatuses may include using a mobile device to capture occurrences of multimedia data as well as information relating to the location of those occurrences, and transmitting representations of those occurrences and information to a server computer. The server computer may identify the copyrighted work associated with the multimedia data, determine if a license for performance of that work exists, determine a price for its performance/display, and generate and then send an invoice for the performance of the copyrighted work.

24 Claims, 6 Drawing Sheets

(51) Int. Cl.
*G06Q 30/02* (2012.01)
*G06Q 30/06* (2012.01)
*G06Q 50/18* (2012.01)
*G06Q 30/00* (2012.01)

(56) References Cited

U.S. PATENT DOCUMENTS

| | | | |
|---|---|---|---|
| 8,751,527 B1* | 6/2014 | Riggio | G06F 16/685 |
| | | | 707/770 |
| 9,396,237 B1* | 7/2016 | Shah | G06Q 10/10 |
| 9,418,669 B2* | 8/2016 | Emerson, III | G10L 19/018 |
| 10,075,485 B2* | 9/2018 | Plazinskiy | H04L 65/602 |
| 2003/0061490 A1* | 3/2003 | Abajian | G06F 16/48 |
| | | | 713/176 |
| 2003/0081781 A1* | 5/2003 | Jensen | H04H 20/31 |
| | | | 380/253 |
| 2003/0158741 A1* | 8/2003 | Nakano | G11B 19/04 |
| | | | 704/503 |
| 2004/0103300 A1* | 5/2004 | Risan | G06F 21/10 |
| | | | 726/33 |
| 2007/0169115 A1* | 7/2007 | Ko | H04L 29/06027 |
| | | | 717/174 |
| 2009/0217344 A1* | 8/2009 | Bellwood | G06F 21/10 |
| | | | 726/1 |
| 2010/0131558 A1 | 5/2010 | Logan et al. | |
| 2011/0010301 A1* | 1/2011 | Tsuruga | G06Q 50/184 |
| | | | 705/310 |
| 2013/0091580 A1* | 4/2013 | Maha | G06F 21/10 |
| | | | 726/26 |
| 2013/0179980 A1 | 7/2013 | Beaumier et al. | |
| 2013/0254159 A1* | 9/2013 | Thramann | G06Q 30/00 |
| | | | 707/609 |
| 2013/0318071 A1* | 11/2013 | Cho | G10L 25/54 |
| | | | 707/722 |
| 2014/0336798 A1 | 11/2014 | Emerson | |
| 2015/0213240 A1 | 7/2015 | Bucciarelli-Tieger et al. | |

OTHER PUBLICATIONS

T. Kalker, D. H. J. Epema, P. H. Hartel, R. L. Lagendijk and M. Van Steen, "Music2Share—copyright-compliant music sharing in P2P systems," in Proceedings of the IEEE, vol. 92, No. 6, pp. 961-970, Jun. 2004. (Year: 2004).*

* cited by examiner

| Record ID | Licensee Name | Licensee Address | Licensed Works | Number of Performances | Crowd Size | Type of Venue |
|---|---|---|---|---|---|---|
| 1 | Jim's Tavern | 123 Happy Street San Francisco, CA 94105 | Song by Artist | 5 | 200 | Restaurant / Bar |
| 2 | Sports Bar | 124 Happy Street San Francisco, CA 94105 | Football Game | 1 | 100 | Restaurant / Bar |
| 3 | | | | | | |
| 4 | | | | | | |

FIG. 6

SYSTEM, METHOD, AND APPARATUS FOR DETECTING UNLICENSED PERFORMANCES OF COPYRIGHTED CREATIVE WORKS

BACKGROUND OF THE INVENTION

1. Field of the Invention

This invention relates generally to detecting performances and, in non-limiting embodiments, to systems, methods, and apparatuses for detecting unlicensed performances of copyrighted creative works.

2. Technical Considerations

Restaurants, bars, and other venues often play music and movies or display television broadcasts without the necessary license rights, and when such works are played or displayed for commercial purposes (e.g., to increase patronage), this can be considered a public performance. Copyright holders often seek to monitor public performances and sell/grant license rights where necessary. However, their employees and agents cannot be everywhere. What is needed is a technical solution to detect these performances and enable copyright holders to collect appropriate compensation for such performances by utilizing patrons and members of the public, in aggregate, to detect performances and enable the determination of adequate license coverage. The embodiments disclosed herein address this and other problems.

SUMMARY OF THE INVENTION

Embodiments of the invention are directed to a platform for detecting the display or performance of a copyrighted creative work based in part upon data collected by one or more mobile devices in the possession of patrons, visitors, or mobile device users in proximity to the location of the performance. These mobile devices may collect information about the particular creative work, as well as location information indicating where the creative work was performed or displayed. The mobile device may send this information to a server for processing, which can include analyzing aspects of the creative work to identify it, analyzing information about the physical location at which the work was displayed/performed, and determining whether a license exists for the display/performance of the particular creative work. In addition to detecting the performance, an embodiment of the invention enables a copyright holder or its agent to calculate an appropriate price for a display/performance, generate an invoice based on that price, and send that invoice to the entity suspected to be responsible for the performance/display. The copyright holder or its agent may also wish to compensate patrons/visitors/mobile device users for their participation in such a system—an embodiment of the invention disclosed herein offers the option to transfer money or other items of value to these system participants. The above features could ideally occur in an entirely automated fashion, without requiring any user input or intervention.

According to a non-limiting embodiment or aspect, provided is a computer-implemented method of detecting a performance of a creative work comprising receiving, by a server, a digital representation of an occurrence of multimedia data; receiving, by the server, information relating to a physical location of the occurrence; determining, by the server, whether the digital representation is part of a copyrighted work; and determining, by the server, whether a license exists for a performance of the copyrighted work, based upon the information relating to the physical location.

In one non-limiting embodiment or aspect, the computer-implemented method further comprises determining, by the server, a price for the performance, wherein the price is based on at least one of the following: (a) a total number of digital representations received, (b) a time at which the digital representation is received, (c) a known profile of the physical location, or any combination thereof.

In one non-limiting embodiment or aspect, the computer-implemented method further comprises generating, by the server, an invoice for the price of the performance.

In one non-limiting embodiment or aspect, the computer-implemented method further comprises sending, by the server, the invoice to an entity associated with the physical location.

In one non-limiting embodiment or aspect, the computer-implemented method further comprises searching a database to determine if a copyright has been registered for the copyrighted work.

In one non-limiting embodiment or aspect, the information relating to a physical location comprises at least one of the following: geographical coordinates, a street address, a business name, or any combination thereof.

In one non-limiting embodiment or aspect, the method is performed without user intervention.

In one non-limiting embodiment or aspect, the server comprises multiple separate computers.

According to a non-limiting embodiment or aspect, a computer-implemented method of detecting a performance of a creative work comprises capturing, by a mobile device, a digital representation of an occurrence of multimedia data; detecting, by the mobile device, a physical location of the occurrence; and sending to a server, by the mobile device, the digital representation and information relating to the physical location, wherein the server determines: (a) whether the digital representation is part of a copyrighted work; and (b) whether a license exists for performance of the copyrighted work, based upon the information relating to the physical location.

In one non-limiting embodiment or aspect, the server further determines a price for the performance, wherein the price is based on at least one of the following: (a) a total number of digital representations received, (b) a time at which the digital representation is received, (c) a known profile of the physical location, or any combination thereof.

In one non-limiting embodiment or aspect, the server further generates an invoice for the price of the performance.

In one non-limiting embodiment or aspect, the server further sends the invoice to an entity associated with the physical location.

In one non-limiting embodiment or aspect, the server further determines whether a copyright has been registered for the copyrighted work.

In one non-limiting embodiment or aspect, the information relating to a physical location comprises at least one of the following: geographical coordinates, a street address, a business name, or any combination thereof.

In one non-limiting embodiment or aspect, the method is performed without user intervention.

According to a non-limiting embodiment or aspect, a system for detecting a performance of a creative work comprises a mobile device; and a server configured to: receive a digital representation of an occurrence of multimedia data; receive information relating to a physical location of the occurrence; determine whether the digital representation is part of a copyrighted work; and determine whether a license exists for performance of the copyrighted work, based upon the information relating to the physical location; wherein the mobile device is configured to: capture the digital representation of the occurrence; detect the physical location of the occurrence; and send to the server the digital representation and the information relating to the physical location.

In one non-limiting embodiment or aspect, the server is further configured to determine a price for the performance, wherein the price is based on at least one of the following: (a) a total number of digital representations received, (b) a time at which the digital representation is received, (c) a known profile of the physical location, or any combination thereof.

In one non-limiting embodiment or aspect, the server is further configured to generate an invoice for the price of the performance.

In one non-limiting embodiment or aspect, the server is further configured to send the invoice to an entity associated with the physical location.

In one non-limiting embodiment or aspect, the information relating to a physical location comprises at least one of the following: geographical coordinates, a street address, a business name, or any combination thereof.

In one non-limiting embodiment or aspect, the server is further configured to search a database to determine if a copyright has been registered for the copyrighted work.

In one non-limiting embodiment or aspect, the server is further configured to execute a value transfer to a user of the mobile device.

According to a non-limiting embodiment or aspect, a server comprises a processor; a memory; an operating system; a means for identifying a copyrighted work; and a means for determining whether a license exists for a performance of the copyrighted work.

In one non-limiting embodiment or aspect, the server further comprises a means for determining a price for the performance of the copyrighted work.

Further non-limiting embodiments or aspects are set forth in the following numbered clauses:

Clause 1: A computer-implemented method of detecting a performance of a creative work comprising: receiving, by a server, a digital representation of an occurrence of multimedia data; receiving, by the server, information relating to a physical location of the occurrence; determining, by the server, whether the digital representation is part of a copyrighted work; and determining, by the server, whether a license exists for a performance of the copyrighted work, based upon the information relating to the physical location.

Clause 2: The computer-implemented method of clause 1, further comprising: determining, by the server, a price for the performance, wherein the price is based on at least one of the following: (a) a total number of digital representations received, (b) a time at which the digital representation is received, (c) a known profile of the physical location, or any combination thereof.

Clause 3: The computer-implemented method of clauses 1 or 2, further comprising: generating, by the server, an invoice for the price of the performance.

Clause 4: The computer-implemented method of any of clauses 1-3, further comprising: sending, by the server, the invoice to an entity associated with the physical location.

Clause 5: The computer-implemented method of any of clauses 1-4, further comprising: searching a database to determine if a copyright has been registered for the copyrighted work.

Clause 6: The computer-implemented method of any of clauses 1-5, wherein the information relating to a physical location comprises at least one of the following: geographical coordinates, a street address, a business name, or any combination thereof.

Clause 7: The computer-implemented method of any of clauses 1-6, wherein the method is performed without user intervention.

Clause 8: The computer-implemented method of any of clauses 1-7, wherein the server comprises multiple separate computers.

Clause 9: A computer-implemented method of detecting a performance of a creative work comprising: capturing, by a mobile device, a digital representation of an occurrence of multimedia data; detecting, by the mobile device, a physical location of the occurrence; and sending to a server, by the mobile device, the digital representation and information relating to the physical location, wherein the server determines: (a) whether the digital representation is part of a copyrighted work; and (b) whether a license exists for performance of the copyrighted work, based upon the information relating to the physical location.

Clause 10: The computer-implemented method of clause 9, wherein the server further determines a price for the performance, wherein the price is based on at least one of the following: (a) a total number of digital representations received, (b) a time at which the digital representation is received, (c) a known profile of the physical location, or any combination thereof.

Clause 11: The computer-implemented method of clauses 9 or 10, wherein the server further generates an invoice for the price of the performance.

Clause 12: The computer-implemented method of any of clauses 9-11, wherein the server further sends the invoice to an entity associated with the physical location.

Clause 13: The computer-implemented method of any of clauses 9-12, wherein the server further determines whether a copyright has been registered for the copyrighted work.

Clause 14: The computer-implemented method of any of clauses 9-13, wherein the information relating to a physical location comprises at least one of the following: geographical coordinates, a street address, a business name, or any combination thereof.

Clause 15: The computer-implemented method of any of clauses 9-14, wherein the method is performed without user intervention.

Clause 16: A system for detecting a performance of a creative work, comprising: a mobile device; and a server configured to: receive a digital representation of an occurrence of multimedia data; receive information relating to a physical location of the occurrence; determine whether the digital representation is part of a copyrighted work; and determine whether a license exists for performance of the copyrighted work, based upon the information relating to the physical location; wherein the mobile device is configured to: capture the digital representation of the occurrence; detect the physical location of the occurrence; and send to the server the digital representation and the information relating to the physical location.

Clause 17: The system of clause 16, wherein the server is further configured to determine a price for the performance, wherein the price is based on at least one of the following: (a) a total number of digital representations received, (b) a time at which the digital representation is received, (c) a known profile of the physical location, or any combination thereof.

Clause 18: The system of clauses 16 or 17, wherein the server is further configured to generate an invoice for the price of the performance.

Clause 19: The system of any of clauses 16-18, wherein the server is further configured to send the invoice to an entity associated with the physical location.

Clause 20: The system of any of clauses 16-19, wherein the information relating to a physical location comprises at least one of the following: geographical coordinates, a street address, a business name, or any combination thereof.

Clause 21: The system of any of clauses 16-20, wherein the server is further configured to search a database to determine if a copyright has been registered for the copyrighted work.

Clause 22: The system of any of clauses 16-21, wherein the server is further configured to execute a value transfer to a user of the mobile device.

Clause 23: A server comprising: a processor; a memory; an operating system; a means for identifying a copyrighted work; and a means for determining whether a license exists for a performance of the copyrighted work.

Clause 24: The server of clause 23, further comprising: a means for determining a price for the performance of the copyrighted work.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

As used herein, the terms "communication" and "communicate" refer to the receipt or transfer of one or more signals, messages, calls, commands, or other type of data. For one unit (e.g., any device, system, or component thereof) to be in communication with another unit means that the one unit is able to receive data from and/or transmit data to the other unit. A communication may use a direct or indirect connection, and may be wired and/or wireless in nature. Additionally, two units may be in communication with each other even though the data transmitted may be modified, processed, routed, etc., between the first and second unit. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible.

Embodiments of the present invention are directed to systems, methods, apparatuses, and computer readable media for analyzing occurrences of multimedia data (including sounds, images, and videos) and determining, based on the location of those occurrences, whether a license exists for the performance or display of that multimedia data. This determination can then be used to determine a price for the public performance or display of those items. In some embodiments, a resident software module may be executed within a device to receive and analyze the occurrence of multimedia data, and to detect the location of that occurrence. In some embodiments, analysis of the occurrence of multimedia data may occur at a remotely located server.

Prior to discussing embodiments of the invention, description of some terms may be helpful in understanding these embodiments.

A "digital representation" may include an electronic capture or recording of multimedia data, such as sounds, images, or video data. This electronic capture or recording may be persistently or ephemerally stored in a memory in an electronic file format or as raw binary data. This electronic capture or recording may include all or part of the multimedia data, but need not be a complete capture of the entire multimedia data.

"Multimedia data" may include a sound, video, image, waveforms, including frequency/amplitude of the same, or any other auditory or visual data. Sound data may further include music, speech, or any other auditory noise. Sound need not be audible to a human ear, though. Video data may include one or more images recorded or captured sequentially, and may also include sound data to accompany those images. Video data may include television broadcasts, movies, or other such displays. Image data includes photographic captures of sights, scenes, or other imagery. Examples of image data may include works of art, posters, or still, single image photographs of video data.

A "creative work" may include a sound, video, image, or other form of multimedia data.

A "copyrighted work" may include anything protectable by copyright law in any jurisdiction, regardless of whether a copyright has been formally registered with a government office. Copyrighted works may include any original works of authorship including literary, dramatic, musical, and artistic works, such as poetry, novels, movies, songs, computer software, and architecture.

A "license" may include a legal right or permission to perform or display a copyrighted work. A license may or may not be personal to an individual or business.

A "mobile device" may be any type of electronic computing device that is portable and operates using electricity. In some embodiments, mobile device may have a primary function, or a function that most closely aligns with the mobile device's purpose. In some embodiments, the mobile device may have one or more secondary functions (functions other than the device's primary function). In some embodiments, a mobile device may be a special purpose portable computer designed specifically to detect occurrences of copyrighted works and determine whether those occurrences constitute a licensed or unlicensed performance of the work.

A "physical location" may include geographical coordinates, a mailing address, or a name of a particular business, location, or venue. Geographical coordinates may include latitude, longitude, and elevation.

A "server" or "server computer" may include one or more computing devices, which can be individual, stand-alone machines located at the same or different locations, and may be owned or operated by the same or different entities, and may further be one or more clusters of distributed computers or "virtual" machines housed within a datacenter. It should be understood and appreciated by a person of skill in the art that functions performed by one "server" can be spread across multiple disparate computing devices for various reasons. As used herein, a "server" is intended to refer to all such scenarios, and should not be construed or limited to one specific configuration.

Figure 1:
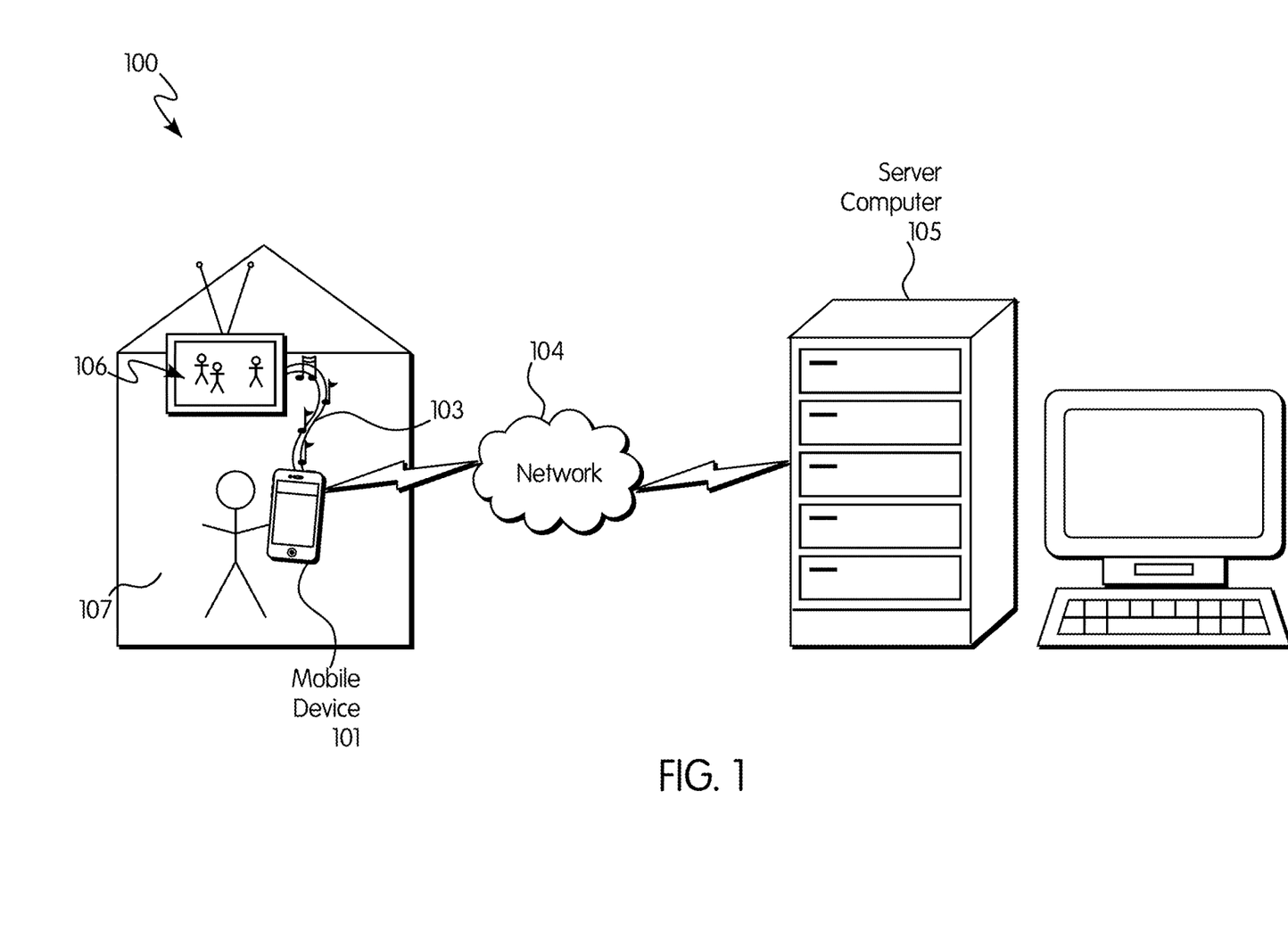
FIG. 1 depicts an illustrative example of a system or architecture for implementing detection of unlicensed performances of creative works.

FIG. 1 depicts an illustrative example of a system 100 in which techniques for implementing a detection of a creative work may be implemented. System 100 may include mobile device 101, which is capable of communicating with server computer 105 via one or more networks 104. In some embodiments, the device 101 may capture occurrences of multimedia video/image data 106 and/or multimedia sound data 103. The device 101 may also determine its physical location 107 using components further described in connection with FIG. 2. The device 101 may communicate with server computer 105 via network 104, by sending a digital representation of video/image data 106 and/or sound data 103, along with information relating to physical location 107. The server computer 105 may receive a digital representation of multimedia video/image data 106 and/or multimedia sound data 103, as well as information relating to physical location 107. The server computer 105 may then determine whether the digital representations of multimedia data are part of one or more copyrighted works, and if so, whether a license exists for their performance at location 107.

In some examples, the network(s) 104 may include any one or a combination of many different types of networks, such as wireless networks, the Internet, cable networks, cellular networks, and other private and/or public networks. In addition, the network(s) 104 may comprise multiple different networks. For example, the device 101 may utilize a wireless local area network (WLAN) to communicate with a wireless router, which may then route the communication over a public network (e.g., the Internet) to the server computer 105. It is important to note that while a preferred embodiment includes the use of a mobile device 101, the functionalities described herein could also be performed by a stationary electronic device with the requisite computing power and network connectivity, such as a television or desktop computer.

Figure 2:
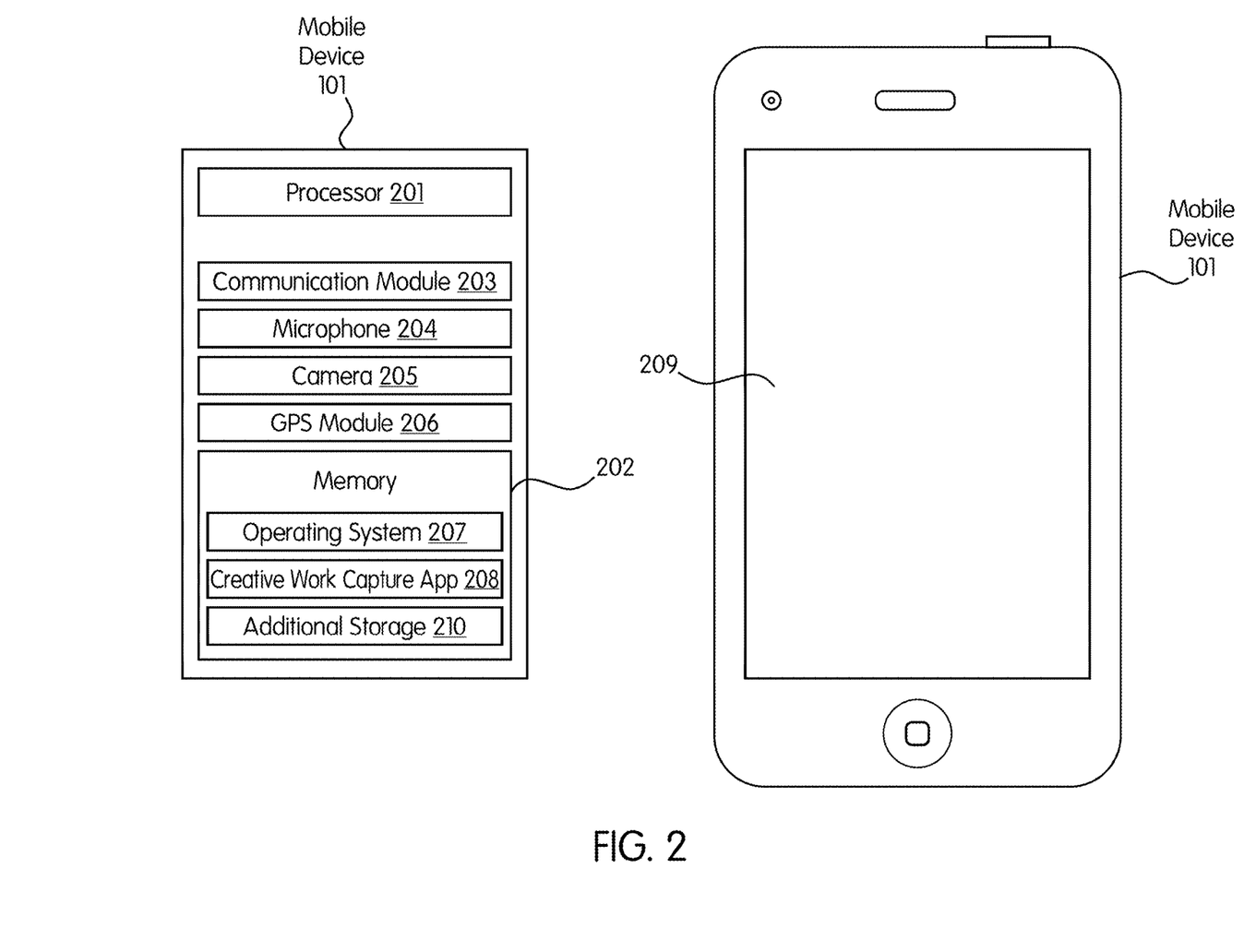
FIG. 2 depicts aspects of elements that may be present in a mobile device and/or system configured to implement a method and/or process in accordance with some embodiments of the present invention.

Turning now to FIG. 2, the mobile device 101 may include one or more processors 201 capable of processing user input. The mobile device 101 may also include one or more input sensors, such as microphone 204, camera 205, and GPS module 206 for receiving user or environmental input. GPS module 206 is capable of receiving or determining a physical location by receiving data from satellites, cellular networks, or other positioning systems. As is known in the art, there are a variety of input sensors capable of detecting user input, such as keyboards, mice, accelerometers, etc. The input obtained by these sensors may comprise a variety of data input types, including, but not limited to, audio data, visual data, tactile/touch input, motion, or biometric data. The mobile device 101 may include various output devices, such as display screen 209 or communication module 203 configured to convey information to one or more users of the electronic device or to other devices. Output devices may also comprise any other suitable means of communicating data. Display screen 209 may be a "touch" screen capable of receiving tactile input. Mobile device 101 may also include a memory 202. An operating system 207 or other software application may reside within memory 202. A creative work capture app 208 may also reside in memory 202, and instructions related to both creative work capture app 208 and operating system 207 may be performed by processor 201. Operating system 207 comprises software that supports a computer's basic functions, such as scheduling tasks, executing applications, and controlling peripherals. Operating system 207 may be any standard off-the-shelf operating system such as Apple iOS™, Microsoft Windows®, Google Android®, or custom-developed, special-purpose operating systems. Memory 202 may also include additional storage 210, which can be used to store additional applications or other data.

Memory 202 may include a creative work capture app 208, which may be a resident software application that is capable of utilizing other input sensors on mobile device 101, such as microphone 204 or camera 205 to capture multimedia data. Creative work capture app 208 may also access GPS module 206, which may provide the physical location of mobile device 101 in the form of geographical coordinates, latitude/longitude, physical address, or any other form of conveying location information. Creative work capture app 208 may store captured multimedia data within memory 202 or in additional storage 210, which may be part of memory 202. Creative work capture app 208 may also utilize communication module 203 to transmit and receive data to other electronic devices via one or more networks. In a preferred embodiment, creative work capture app 208 transmits a digital representation of multimedia data and physical location information. It should be noted that creative work capture app 208 need not be a stand-alone application, and could be integrated into other existing applications, especially those that are used for identifying creative works, such as, for example the Shazam® music identification app, or integrated into operating system 207 itself.

In one embodiment, creative work capture app 208 could run as a process "in the background", while other applications on mobile device 101 are being executed or actively used. In another embodiment, creative work capture app 208 could run and capture multimedia data only while presently engaged by the operator of mobile device 101 in the foreground of a user interface of operating system 207. In embodiments in which creative work capture app 208 runs "in the background" of operating system 207, certain steps could occur to reduce (1) power consumption attributable to the monitoring for and capturing of multimedia data; and (2) the amount of data transmitted by creative work capture app 208. Such power and data conserving steps could include enabling and disabling the multimedia data capture function at specific or random intervals. In an alternative embodiment, once multimedia data has been captured and identified as a specific copyrighted work, if that copyrighted work has a known time-length, as is often the case with music or video data, creative work capture app 208 could disable its multimedia data capture functionality and its transmission of digital representations of multimedia data for the known remainder of the performance of the copyrighted work, based on the remaining time for that performance. In addition to power conservation, this disabling would have the additional benefit of creative work capture app 208 only capturing and transmitting multimedia data corresponding to the same performance of a creative work one time. The time length of the copyrighted work, the relative position in that length at which the multimedia data was captured, and the time remaining for the performance could be determined by and obtained from a remote server. In another embodiment, the time remaining for the performance could be calculated locally at mobile device 101 by subtracting the current time lapsed into the performance at which the capture of multimedia data occurred from the known total length of the copyrighted work.

Figure 3:
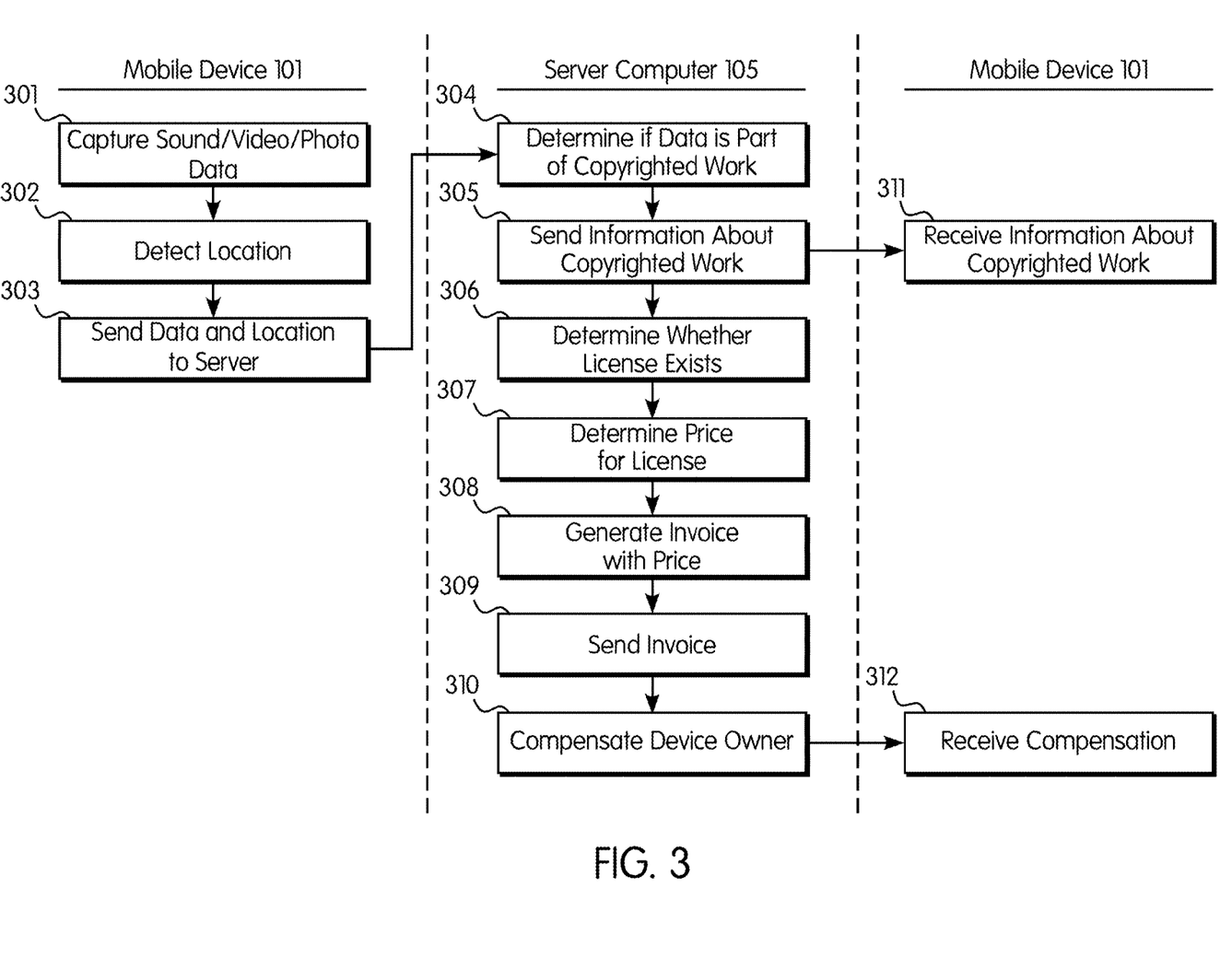
FIG. 3 depicts a process flow for capturing input data and sending it to a server, which determines whether a performance is licensed, in accordance with at least some embodiments.

FIG. 3 is a process flow further illustrating one embodiment of the interactions between mobile device 101 and server computer 105. At step 301, mobile device 101 may capture multimedia data, and physical location may be detected at step 302. Steps 301 and 302 may be performed in either order. At step 303, mobile device 101 may transmit multimedia data or a representation thereof, along with information relating to physical location to server computer 105. Upon receiving at least the multimedia data (or its representation), at step 304, server computer 105 may determine if the multimedia data is part of a copyrighted work. This may occur by analyzing the multimedia data or a portion thereof, identifying patterns contained therein, and then comparing the multimedia data or a portion thereof against a database of other known patterns contained in other copyrighted works. In the area of acoustic analysis, one example of how such pattern analysis may be conducted is contained within the Shazam® music identification app. While this is one such mechanism for identifying copyrighted works, and represents a preferred embodiment, it should be understood that the invention is not intended to be limited to such techniques.

If server computer 105 determines that the multimedia data is not part of a copyrighted work, or if it cannot make a determination, steps 305 through 310 are not performed. However, if server computer 105 determines that the multimedia data is part of a copyrighted work at step 304, then at step 305, once multimedia data has been identified as a specific copyrighted work, if that copyright work has a known time-length, as is often the case with music or video data, server computer 105 could retrieve the known length of the copyrighted work as well as the relative time lapsed into that length of when the capture occurred. The remaining time left in the performance could be calculated by subtracting the current time lapsed into the performance at which the capture of multimedia data at step 301 occurred from the known total length of the copyrighted work. Server computer 105 could then optionally send data corresponding to (1) the length of the copyrighted work; (2) when in that relative length the capture occurred; and (3) the calculated remaining time left in the performance back to mobile device 101. Server computer 105 may next progress to step 306, determining whether a license exists for the performance of this work at the physical location provided. Step 306 may include analyzing the physical location information and comparing it against a list of known license agreements corresponding to businesses, individuals, or venues associated with a particular physical location. If server computer 105 determines that a current license exists, further steps need not be performed. If server computer 105 determines that no license exists for the performance of that work, or the license does not adequately cover the performance, server computer 105 may then determine a price for the license at step 307. This may occur by considering a number of variables, including the number of times multimedia data is captured by disparate devices, as this is indicative of the size of the performance audience. In performing the price determination at step 307, server computer 105 may also consider the type of copyrighted work, its authors, comparable licenses, the nature or type of the physical location at which it was performed, the time of day, and any other data known or available for determining a price to charge. In a preferred embodiment, step 307 would include performing a calculation utilizing a pre-existing formula with these data points to arrive at the price. In an alternative embodiment, the price could also be determined by a third-party entity, as the formula need not be housed or calculated locally.

At step 308, server computer 105 may generate an invoice for the performance, and at step 309, server computer 105 may send or cause the invoice to be sent to the physical location or an individual or business associated with that physical location. In one embodiment, step 309 may involve electronically transmitting the invoice to a known e-mail address associated with the physical location. In another embodiment, server computer 105 may prepare an invoice to be delivered to the physical location's mailing address by a postal mail carrier. It should be understood by individuals of skill in the art that in some embodiments, the steps described in FIG. 3 that are performed by server computer 105 could be performed by multiple devices located at the same or different locations and owned or operated by the same or different entities, or these steps could be performed entirely by mobile device 101, if that device possessed the necessary input data. Therefore, nothing in this paragraph is intended to limit the performance of steps 304 through 310 to server computer 105. Additionally, in some embodiments, it may be desirable to compensate the owner or operator of mobile device 101 for participating in the system. This may optionally occur at step 310, wherein server computer 105 may cause a value transfer of money, points, rewards, or some other item of value to the owner or operator of mobile device 101 as an incentive to participate in the detection of performances/displays of copyrighted creative works. This compensation could also be a percentage of any funds invoiced or collected. Such compensation could be also be calculated by determining the length of time for which the owner or operator of mobile device 101 allows multimedia data to be captured, or by the number of distinct copyrighted works identified from individual captures. In some embodiments, such compensation could also optionally relate to the physical location provided by mobile device 101, or to the specific copyrighted work identified, or to any other information or data likely to be of specific value or interest to the owner or operator of mobile device 101.

Figure 4:
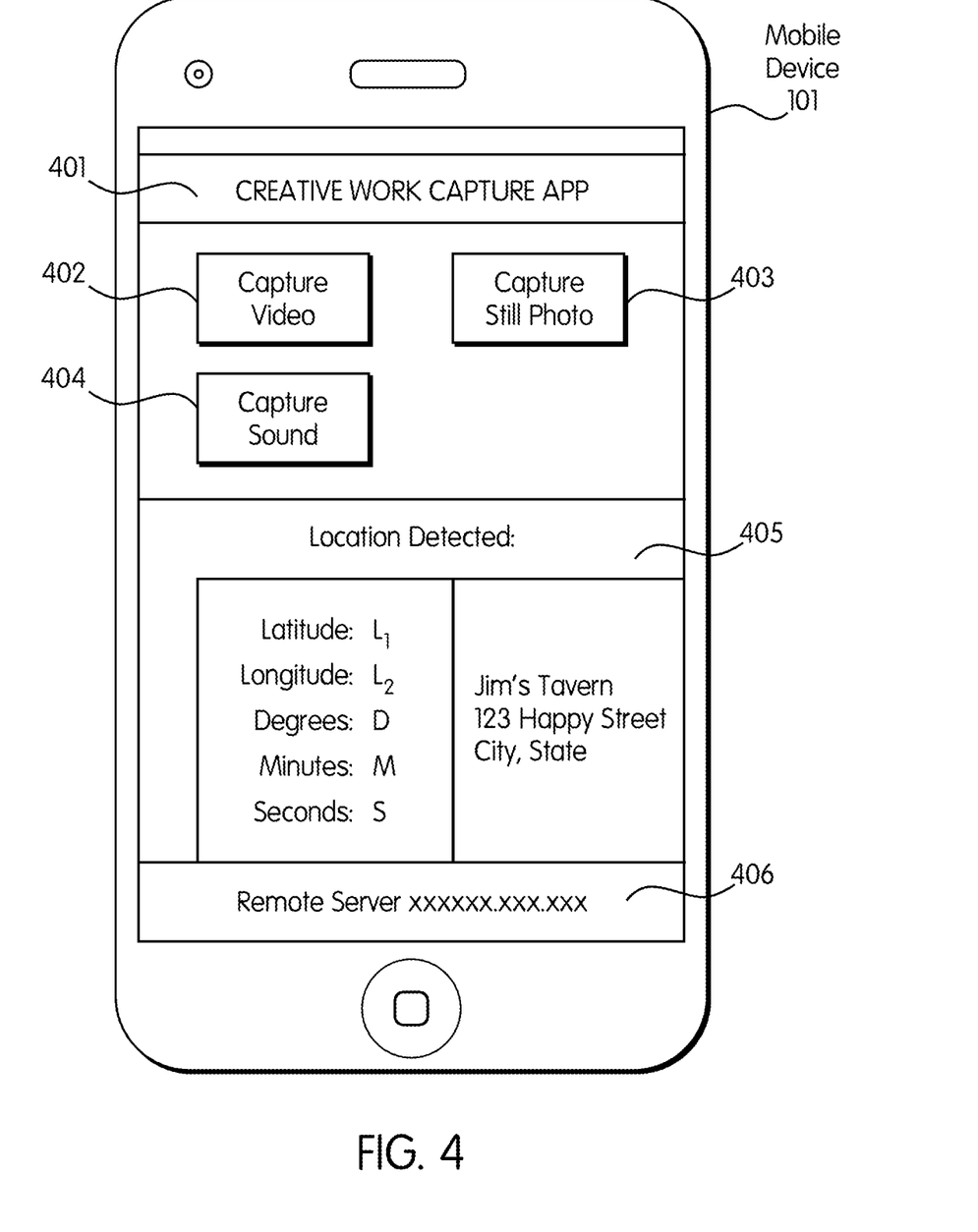
FIG. 4 depicts an illustrative example of a user interface in accordance with at least some embodiments.

FIG. 4 depicts an illustrative example of the menus presented to a user interacting with the creative work capture app residing on mobile device 101. User Interface 401 depicts a potential graphical layout of a creative work capture app and the menus therein. Buttons 402, 403, and 404 each depict selectable functionality within said creative work capture app. While button 402 may enable the creative work capture app to record video, button 403 may enable the creative work capture app to take a photographic image, and button 404 may enable the creative work capture app to record sound, in an alternative embodiment, one button could be used to perform all functions. It will be appreciated that other selectable options may also be used, such as hyperlinks, drop-down menus, checkboxes, icons, and/or the like. Alternatively, in another embodiment, such selectable options may not be required at all, as their functions could be performed by the creative work capture app automatically, without user intervention. In another, alternative embodiment, such functions could be performed by a user via voice command or gesture, inputs which would be sensed via the previously described input sensors contained within mobile device 101. Menu 405 depicts the location data detected by mobile device 101, and menu 406 depicts the Internet address of the remote server to which data captured by the creative work capture app will be sent. While FIG. 4 depicts a possible, non-limiting configuration, it should be appreciated by a person of skill in the art that the arrangement of these particular user interface elements, or even their use/existence in a creative capture app, are purely optional and constitute design choices for the creative work capture app interface.

Figure 5:
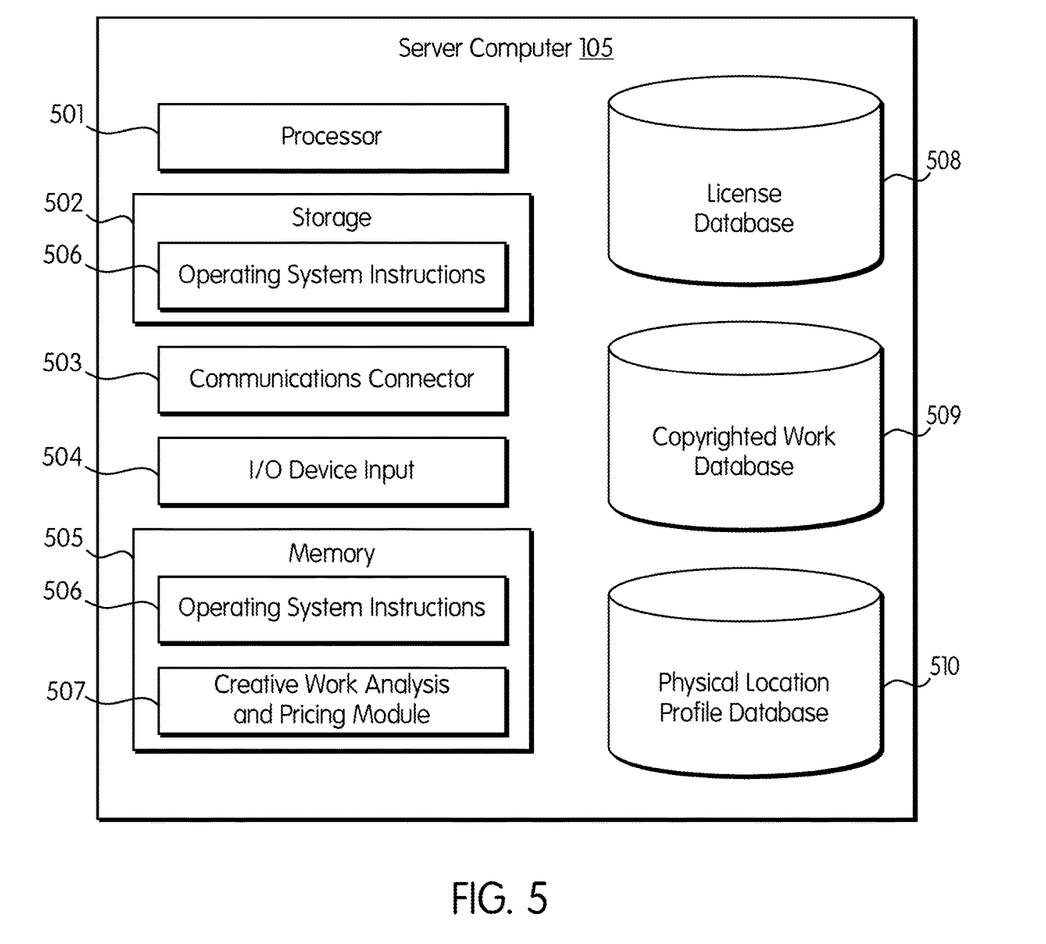
FIG. 5 depicts aspects of elements that may be present in a server computer and/or system configured to implement a method and/or process in accordance with some embodiments of the present invention.

FIG. 5 depicts an exemplary architecture of a server computer 105 capable of receiving data from a mobile device. In some embodiments, server computer 105 may exist as a stand-alone computer system. In other embodiments, server computer 105 may exist as a cluster of distributed computers that are connected to perform distributed processing. In yet another embodiment, server computer 105 may exist as a "virtual machine" running logically within a datacenter containing one or more physical systems. Additionally, in some or all components of server computer 105 may exist in the same physical location as server computer 105 or may be remotely located.

Server computer 105 may contain one or more processors 501, capable of executing computer instructions, and storage 502, which may be comprised of computer memory or other technology capable of storing data persistently. Communications connector 503 may be a networking communications device such as an Ethernet adapter or other such device capable of transmitting and receiving data over a computer network, either wirelessly or via a wired connection. Memory 505 may be computer memory, such as random access memory ("RAM"), capable of quickly storing and accessing data for temporary use while server computer 105 performs operations. Operating system instructions 506 comprises software that supports a computer's basic functions, such as scheduling tasks, executing applications, and controlling peripherals. Operating system instructions 506 may be any standard off-the-shelf operating system such as Microsoft Windows®, Linux, or other custom-developed, special-purpose operating systems. Operating system instructions 506 may be stored within storage 502, and some or all of its instructions may also be placed in memory 505 during execution. In some embodiments, storage 502 and memory 505 may be one and the same.

Creative work analysis and pricing module 507 within server computer 105 may be a software application resident in memory 505, which processes data received from a mobile device relating to an occurrence of a creative work, and physical location data relating to the mobile device's location. Creative work analysis and pricing module 507 may contain computer instructions capable of communicating with license database 508, copyrighted work database 509, and physical location profile database 510. Creative work analysis and pricing module 507 may be capable of analyzing representations of multimedia data to determine if they are part of a copyrighted work. This analysis and identification may occur by analyzing received multimedia data or a portion thereof, identifying patterns contained therein, and then comparing the multimedia data or a portion thereof against information contained within copyrighted work database 509. In the area of acoustic analysis, one example of how such pattern analysis may be conducted is contained within the Shazam® music identification app. While this is one such mechanism for identifying copyrighted works, and represents a preferred embodiment, it should be understood that no embodiment is intended to be limited to such techniques.

Copyrighted work database 509 may contain information about known copyrighted works which can be compared to multimedia data that is captured to identify similarities between the two. If received multimedia data is substantially similar, then creative work analysis and pricing module 507 may conclude that the multimedia data received is an occurrence of the corresponding copyrighted work, using techniques known for the comparison and recognition/identification of multimedia data. Creative work analysis and pricing module 507 may then query physical location profile database 510 using information received about the physical location of the occurrence of the performance of the identified copyrighted work. It should be appreciated to one of skill in the art that resolving a physical address or other information about a particular physical location need not be performed locally within server computer 105, as such functionality is available through third party service providers. Therefore, physical location database 510 may exist entirely independent of server computer 105 and may be located remotely and accessed via an Application Program Interface (API) or other known techniques. Creative work analysis and pricing module 507 may also query license database 508 to determine whether a license exists for the performance of the identified copyrighted work at the particular physical location at which its occurrence was captured. This may occur using the information received from physical location profile database 510 or from other sources, including external systems. License database 508 may be a standard database or data structure capable of storing large amounts of records. In a preferred embodiment, license database 508 contains records or files pertaining to the entities for which a license has been granted to publicly perform certain copyrighted works. It should be appreciated by a person of skill in the art that the aforementioned databases 508, 509, and 510 could be any type of databases capable of storing data and records, such as relational databases, but need not be databases as traditionally defined. In an alternative embodiment, databases 508, 509, and 510 may also be unstructured data files capable of being parsed and searched for relevant information or alternative data structures. In yet another embodiment, databases 508, 509, and 510 may be individual tables within one database.

Creative work analysis and pricing module 507 may conclude that no license exists for the performance of a copyrighted work, or that the license is inadequate to cover the performance. In such instances, creative work analysis and pricing module 507 may determine a price for the performance. This may occur by considering a number of variables, including the number of times multimedia data is captured by disparate devices and transmitted to server computer 105, as this may be indicative of the size of the performance audience. In performing the price determination, creative work analysis and pricing module 507 may also consider the type of copyrighted work, its authors, comparable licenses, the nature or type of the physical location at which it was performed, the time of day, and any other data known or available for determining a price to charge. Creative work analysis and pricing module 507 may then generate and send, or cause to be sent, an invoice to the non-compliant licensee or the establishment/location at which the copyrighted work was performed. The invoice may be sent electronically, physically, or using both methods.

Figure 6:
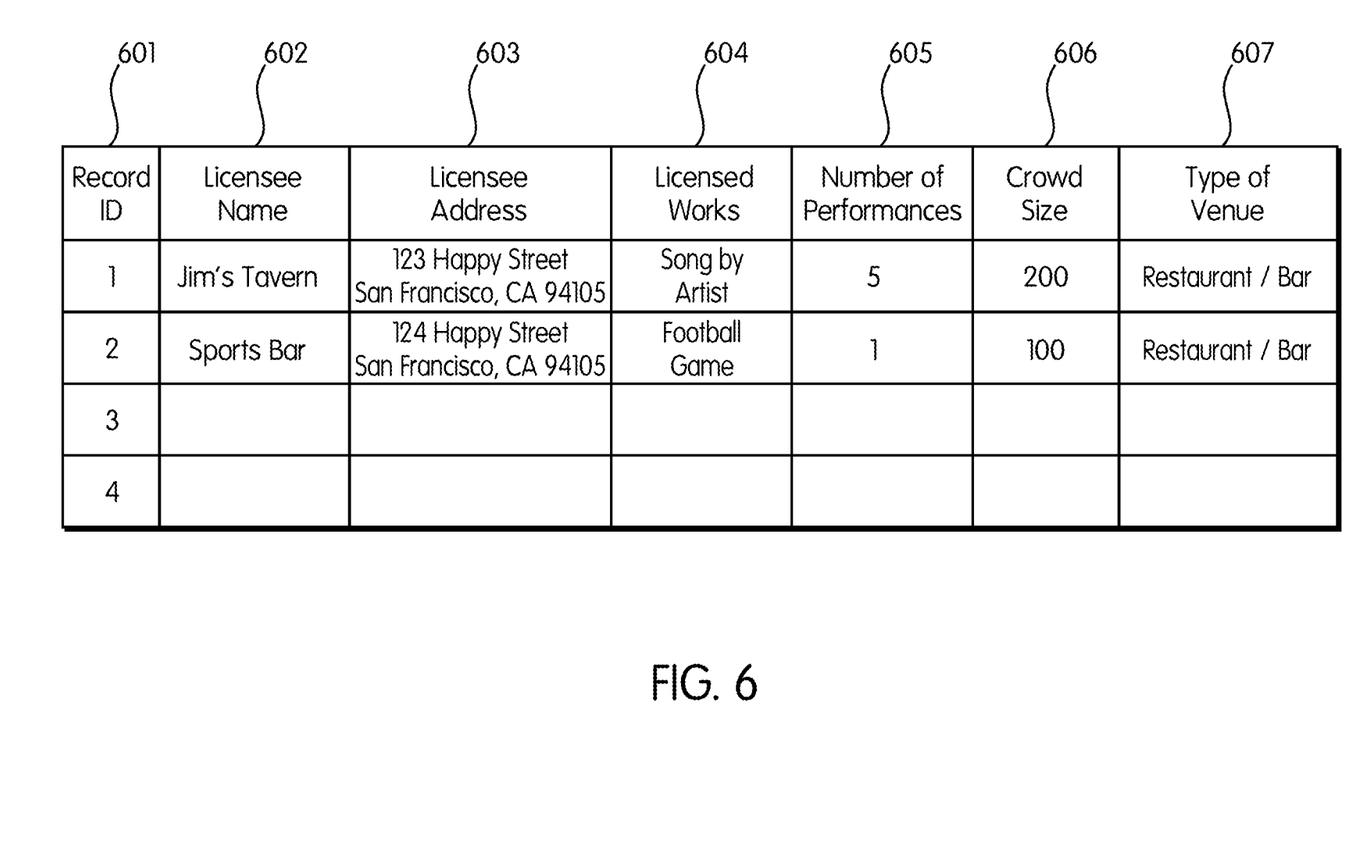
FIG. 6 depicts aspects an exemplary table of records in a database of licensees and the types of data that may be available for use in the detection of unlicensed performances of creative works.

FIG. 6 depicts an example of a table of records that may be contained in a database of licenses. Column 601 represents a unique record ID, which may be used as a database key for indexing the record. Other columns in the database represent information specific to the licensee and the works and performances for which licenses exist. Columns 602 and 603 contain information about the actual licensee or the location in which public performance of copyrighted works has been authorized. Column 602 contains the name of the establishment, if known, while column 603 contains a physical address. In some embodiments, column 603 could contain geographical coordinates instead of a street address.

Column 604 may describe the actual licensed work, and may contain information about its author/performer as well as any other relevant data used in identifying the work, such as its title, the copyright holder, or other information useful in identifying the work. Column 605 may describe the number of authorized performances. In the example of a performance/display/playing of a popular musical work at a bar or restaurant, it is possible that the licensee may wish to perform/display/play the work multiple times in a given month, week, or day. Column 605 allows reflects the number of performances authorized by the licensor such that, if the system, methods, and apparatuses disclosed herein detected a number of performances in excess of that amount, the licensor may be able to generate and send an invoice for those excess performances. Column 606 describes the authorized crowd-size for the public performance, thereby allowing the system to determine if a licensee has exceeded its authorized license when server computer 105 receives a number of disparate multimedia data submissions (or digital representations thereof) exceeding the authorized audience size in a given time period. This is because the number of disparate multimedia data submissions received can serve as a proxy for a minimum estimate of the crowd-size, assuming one submission per attendee/patron. Lastly, column 607 contains additional information specific to the type of establishment/venue/licensee.

It should be understood and appreciated by a person of skill in the art that nothing in the above is intended to limit the functionality and structures described herein. The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents. One or more features from any embodiment may be combined with one or more features of any other embodiment without departing from the scope of the invention. A recitation of "a," "an," or "the" is intended to mean "one or more" unless specifically indicated to the contrary. All patents, patent applications, publications, and descriptions mentioned above are herein incorporated by reference in their entirety for all purposes. None is admitted to be prior art.

The invention claimed is:

1. A computer-implemented method of detecting a performance of a creative work, comprising:
 receiving, by a server, a digital representation of an occurrence of multimedia data from a mobile device enabled to capture multimedia data;
 determining, by the server, that the digital representation is part of a copyrighted work;
 determining, by the server, a time-length associated with the copyrighted work and/or a remainder of time associated with the copyrighted work;
 generating, by the server, a message comprising the time-length and/or the remainder of time associated with the copyrighted work;
 communicating, by the server, the message to the mobile device to cause the mobile device to disable the capture of multimedia data for the remainder of time and, after the remainder of time has elapsed, re-enable the mobile device to capture multimedia data;
 receiving, by the server, information relating to a physical location of the occurrence; and
 determining, by the server, whether a license exists for a performance of the copyrighted work, based upon the information relating to the physical location.

2. The computer-implemented method of claim 1, further comprising:
 determining, by the server, a price for the performance, wherein the price is based on at least one of the following: (a) a total number of digital representations received, (b) a time at which the digital representation is received, (c) a known profile of the physical location, or any combination thereof.

3. The computer-implemented method of claim 2, further comprising:
 generating, by the server, an invoice for the price of the performance.

4. The computer-implemented method of claim 3, further comprising:
 sending, by the server, the invoice to an entity associated with the physical location.

5. The computer-implemented method of claim 1, further comprising:
 searching a database to determine if a copyright has been registered for the copyrighted work.

6. The computer-implemented method of claim 1, wherein the information relating to a physical location comprises at least one of the following: geographical coordinates, a street address, a business name, or any combination thereof.

7. The computer-implemented method of claim 1, wherein the method is performed without user intervention.

8. The computer-implemented method of claim 1, wherein the server comprises multiple separate computers.

9. A computer-implemented method of detecting a performance of a creative work, comprising:
 capturing, by a mobile device, a digital representation of an occurrence of multimedia data;
 detecting, by the mobile device, a physical location of the occurrence; and sending to a server, by the mobile device, the digital representation and information relating to the physical location, to cause the server to:
   determine whether the digital representation is part of a copyrighted work;
   determine a time-length associated with the copyrighted work and/or a remainder of time associated with the copyrighted work;
   generate a message comprising the time-length and/or the remainder of time associated with the copyrighted work; and
   communicate the message to the mobile device; and
   determine whether a license exists for performance of the copyrighted work, based upon the information relating to the physical location;
wherein the mobile device receiving the message causes the mobile device to disable the capture of multimedia data for the remainder of time and, after the remainder of time has elapsed, re-enable the mobile device to capture multimedia data.

10. The computer-implemented method of claim 9, wherein the server is further caused to determine a price for the performance, wherein the price is based on at least one of the following: (a) a total number of digital representations received, (b) a time at which the digital representation is received, (c) a known profile of the physical location, or any combination thereof.

11. The computer-implemented method of claim 10, wherein the server is further caused to generate an invoice for the price of the performance.

12. The computer-implemented method of claim 11, wherein the server is further caused to send the invoice to an entity associated with the physical location.

13. The computer-implemented method of claim 9, wherein the server is further caused to determine whether a copyright has been registered for the copyrighted work.

14. The computer-implemented method of claim 9, wherein the information relating to a physical location comprises at least one of the following: geographical coordinates, a street address, a business name, or any combination thereof.

15. The computer-implemented method of claim 9, wherein the method is performed without user intervention.

16. A system for detecting a performance of a creative work, comprising:
   a mobile device enabled to capture multimedia data; and
   a server configured to:
      receive a digital representation of an occurrence of multimedia data from the mobile device;
      determine that the digital representation is part of a copyrighted work;
      determine a time-length associated with the copyrighted work and/or a remainder of time associated with the copyrighted work;
      generate a message comprising the time-length and/or the remainder of time associated with the copyrighted work;
      communicate the message to the mobile device to cause the mobile device to disable the capture of multimedia data for the remainder of time and, after the remainder of time has elapsed, re-enable the mobile device to capture multimedia data;
      receive information relating to a physical location of the occurrence; and
      determine whether a license exists for performance of the copyrighted work, based upon the information relating to the physical location;
   wherein the mobile device is configured to:
      capture the digital representation of the occurrence;
      detect the physical location of the occurrence; and
      send to the server the digital representation and the information relating to the physical location.

17. The system of claim 16, wherein the server is further configured to determine a price for the performance, wherein the price is based on at least one of the following: (a) a total number of digital representations received, (b) a time at which the digital representation is received, (c) a known profile of the physical location, or any combination thereof.

18. The system of claim 17, wherein the server is further configured to generate an invoice for the price of the performance.

19. The system of claim 18, wherein the server is further configured to send the invoice to an entity associated with the physical location.

20. The system of claim 16, wherein the information relating to the physical location comprises at least one of the following: geographical coordinates, a street address, a business name, or any combination thereof.

21. The system of claim 16, wherein the server is further configured to search a database to determine if a copyright has been registered for the copyrighted work.

22. The system of claim 16, wherein the server is further configured to execute a value transfer to a user of the mobile device.

23. A server comprising:
   a processor;
   a memory;
   an operating system;
   means for receiving a digital representation of an occurrence of multimedia data from a mobile device enabled to capture multimedia data;
   means for determining that the digital representation is part of a copyrighted work;
   means for determining a time-length associated with the copyrighted work and/or a remainder of time associated with the copyrighted work;
   means for generating a message comprising the time-length and/or the remainder of time associated with the copyrighted work;
   means for communicating the message to the mobile device to cause the mobile device to disable the capture of multimedia data for the remainder of time and, after the remainder of time has elapsed, re-enable the mobile device to capture multimedia data;
   means for receiving information relating to a physical location of the occurrence; and
   means for determining whether a license exists for a performance of the copyrighted work, based upon the information relating to the physical location.

24. The server of claim 23, further comprising:
   means for determining a price for the performance of the copyrighted work.

* * * * *